Aug. 4, 1931. F. LORNITZO 1,817,010
BEAD THREADING MACHINE
Filed Sept. 5, 1928 5 Sheets-Sheet 1

Franz Lornitzo
Inventor
By his Attorney

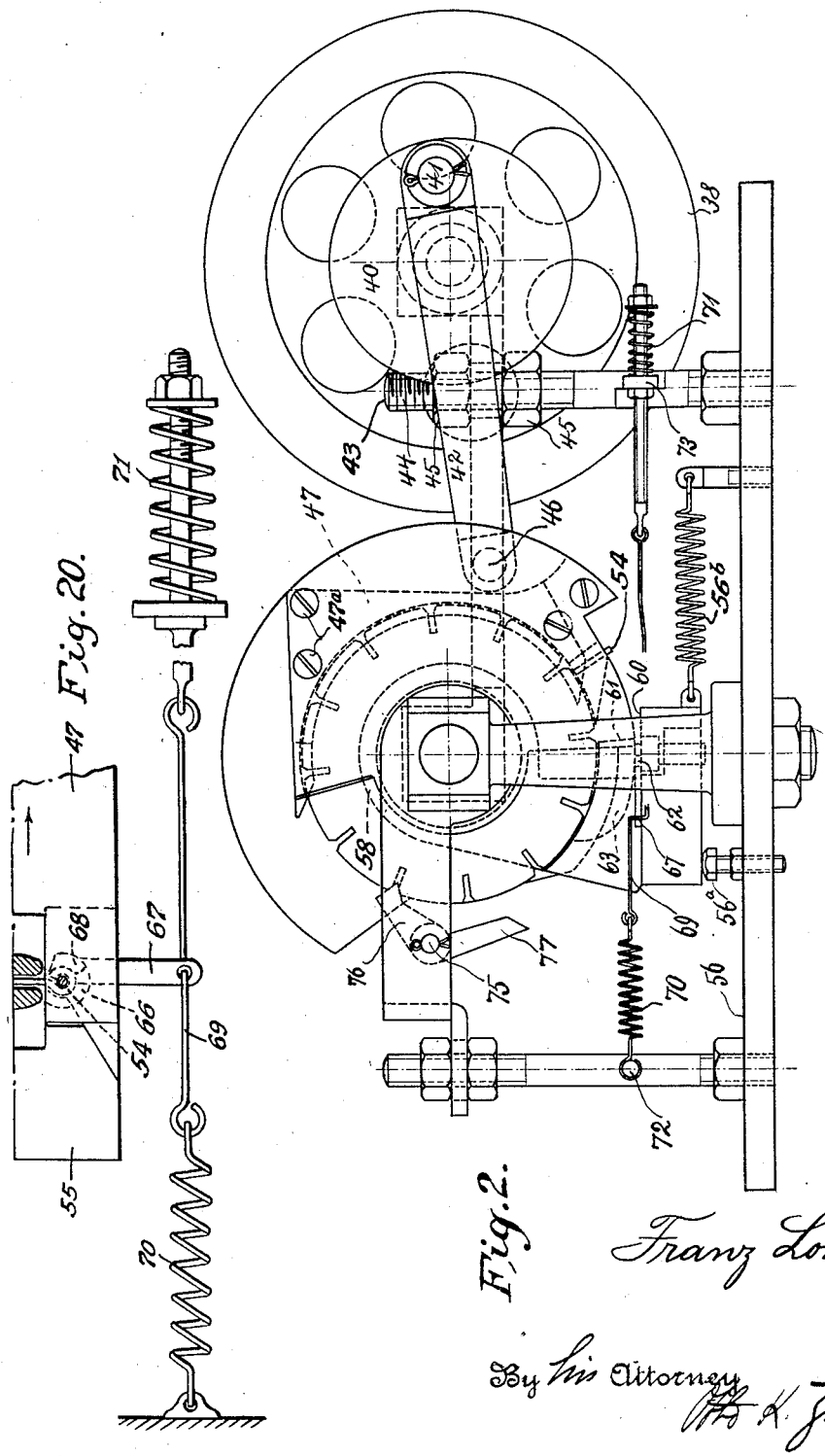

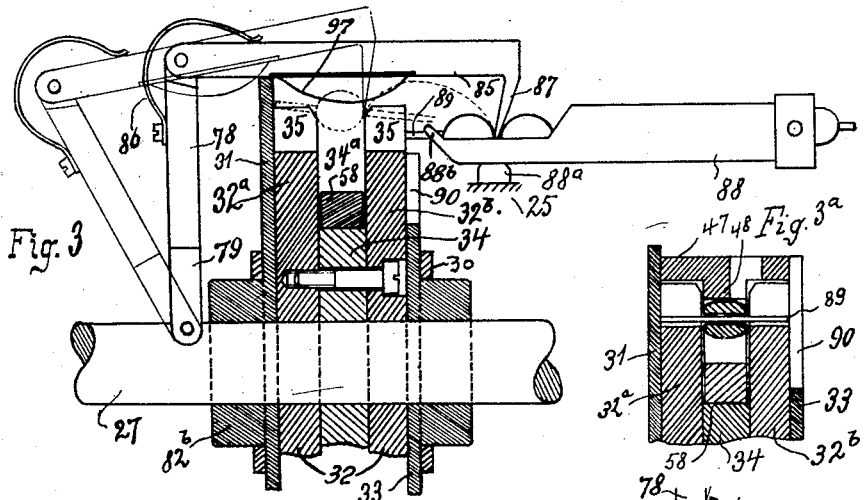
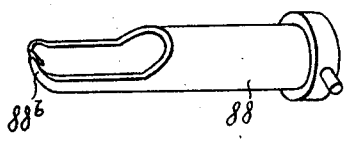
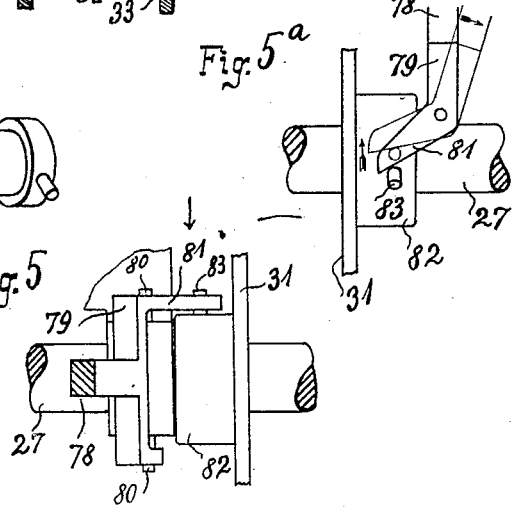
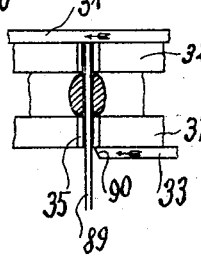
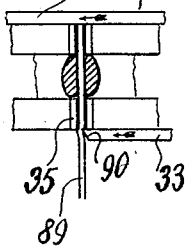
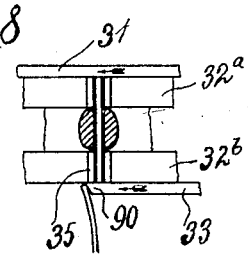

Aug. 4, 1931.  F. LORNITZO  1,817,010
BEAD THREADING MACHINE
Filed Sept. 5, 1928   5 Sheets-Sheet 4
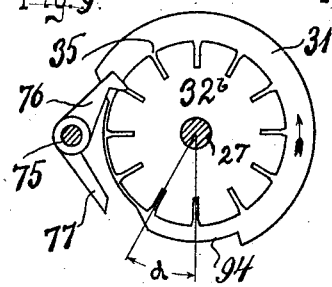
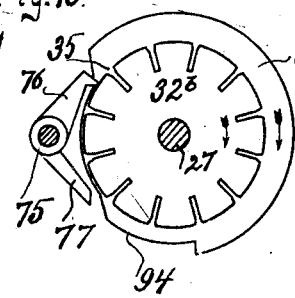
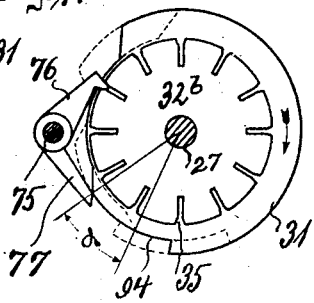
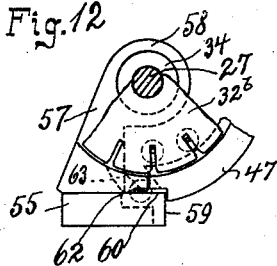
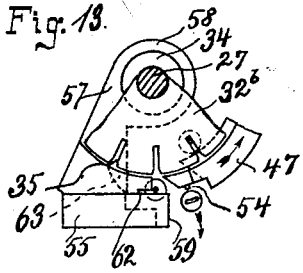
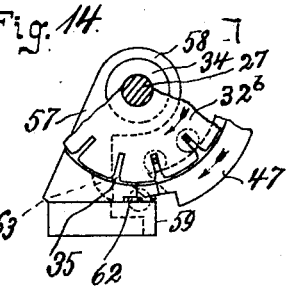
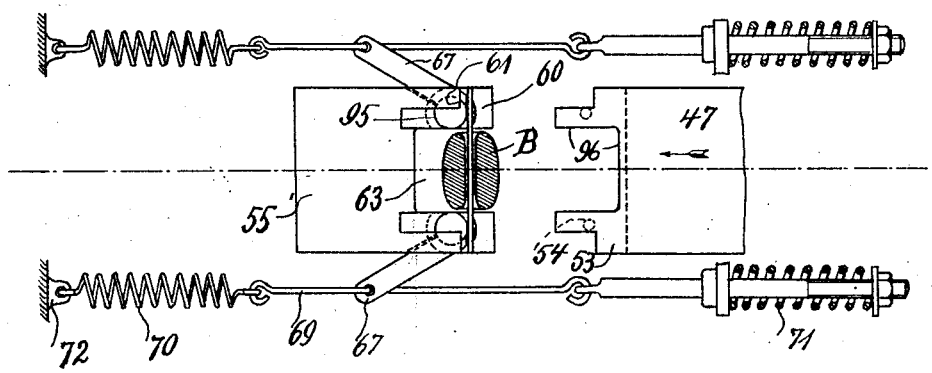
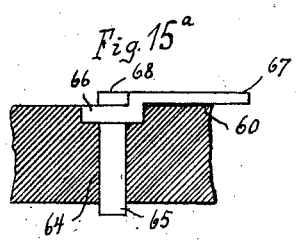
Franz Lornitzo
Inventor
By his Attorney Aug. 4, 1931.　　　F. LORNITZO　　　1,817,010
BEAD THREADING MACHINE
Filed Sept. 5, 1928　　　5 Sheets-Sheet 5

Franz Lornitzo
Inventor

By his Attorney

Patented Aug. 4, 1931

1,817,010

UNITED STATES PATENT OFFICE

FRANZ LORNITZO, OF UNION CITY, NEW JERSEY

BEAD THREADING MACHINE

Application filed September 5, 1928. Serial No. 304,121.

This invention relates to bead threading machines and it particularly relates to bead threading machines for threading beads on wires which at their ends are turned into hooked shaped loops, or eyes, so that the beads can be assembled into chains, bracelets, or the like ornamental articles. It is the object of the invention to provide means by which the present method of filing the single bead on the wire by hand is abolished and substituted by automatic means so as to increase the speed of the work to accomplish a greater output, to make the finished article of more regular and accurate shape and particularly to reduce the cost of manufacturing the desired articles. These and other objects in view will be more apparent from the following description of my new invention and by the accompanying drawings illustrating the same, in which drawings Fig. 1 is a perspective view of the main part of the machine, some parts having been only indicated by fine lines, said indicated parts being more fully illustrated in the following figures.

Fig. 2 is a side elevation of the machine as illustrated by Fig. 1.

Fig. 3 is fragmentary sectional view of the middle part of the machine on the line 3—3 of Figure 1 when the upper front end of a crescent shaped oscillating member is out of sight; this figure shows among other features particularly the part of my new machine by which one bead, already threaded on the wire, is lifted into the main part of the machine, and the wire is cut off to have its ends bent into loops.

Fig. 3a shows the upper middle part of Fig. 3 with a sectional view of the upper front end of aforesaid oscillating member.

Fig. 4 is a perspective detail view of the spoon, or scoop, through which the beads must travel before being set into machine proper.

Fig. 5 is a fragmentary top view of the double arm pulling lever, shown in Figure 2, and Fig. 5a is a fragmentary side elevation seen in direction of the arrow in Fig. 5.

Figs. 6, 7 and 8 show a bead, threaded on a wire, deposited in two opposite recesses of the forwarding roller; they furthermore show the relation of the forwarding roller with one of the adjoining plates, provided with a cutting edge to cut off the wire close to the orifice of one of the recesses of the forwarding roller.

Figs. 9, 10 and 11 show the relation of the recessed forwarding roller with one of the adjoining plates co-operating with a pawl to regulate the revolutions of the forwarding roller.

Figure 1:
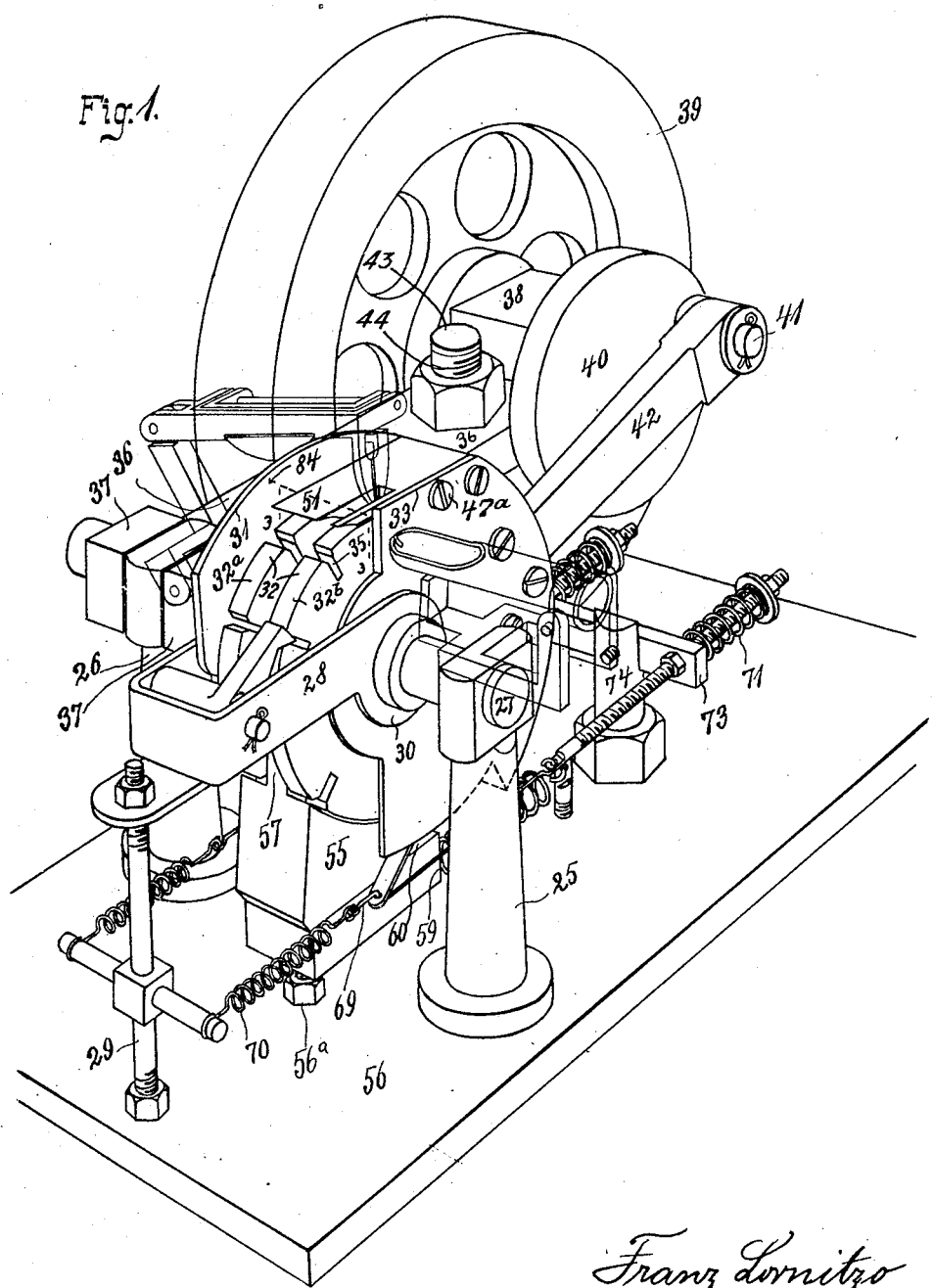

Figs. 12, 13, and 14 are fragmentary detail views showing the relation of the forwarding roller with the support and the looping device.

Fig. 15 shows a diagrammatic view of the means forming the loops at the ends of the wire, and 15a shows how the arm, bending the wires, is rotarily arranged in the anvil supporting the wire.

Figs. 16, 17, 18, 19 and 20 are diagrammatic views showing the cooperative engagement of the various parts bending the ends of the wire into loops.

Like numerals denote like parts in all the figures of the drawings.

Referring now to the drawings the numerals 25 and 26 denote perpendicular standards in which a shaft 27 is horizontally arranged. A U-shaped frame 28 is horizontally arranged at its middle portion, upon a standard 29 and terminates into two annular plates 30 provided with centrally located annular apertures so that said terminals 30 can be arranged around hubs of Cam 31 and of the plate 33 movably arranged on the shaft 27, a grooved roller 32 being also movably arranged between said Cam 31 and plate 33. The grooved roller 32 is formed by the two plates 32a and 32b and the center plate 34 arranged between them, said plate 34 and the plates 32a and 32b being rigidly joined by screws, or other suitable means; an annular groove 34a is arranged equi-distantly from the peripheral edges of the plates 32a and 32b. The plates 32a and 32b are furthermore provided with a plurality of, for instance ten recesses 35, said recesses being in their lowest part slightly wider than the diameter of the wire, which is used for threading the beads, and at its upper end the recesses 35 are flaring outwardly so that the wire will fall more easily into said recesses, when cut off in the manner to be subsequently shown. The recesses 35 are preferably arranged radially and equidistantly from each other.

An arm 36 is arranged horizontally and is provided at its front end with a fork of two upwardly extending plates 37, of any suitable, for instance rectangular cross section; each of said plates has a centrally disposed aperture sufficiently wide to have the shaft 27 rotarily arranged therein. The upper terminal of standard 26 is operatively disposed between said plates 37.

At the rear end of the arm 36 a block 38 is extending upwardly; it has approximately the same cross-section as the plates 37 and is furthermore provided with an annular aperture (not shown) so as to serve as a journal for a shaft (not shown) at the outer end of which a flywheel 39 is rigidly secured while on the inner side the disc 40 is centrally secured, to which at the stud 41, disposed near the peripheral of said disc 40, the rod 42 is rotarily arranged.

From Fig. 2 it can be noticed that near its rear end the arm 36 is furthermore supported by a standard 43, provided at its upper end with a screw thread 44 engaged by two adjusting screws 45, by which it is rigidly kept, but by the position between which the whole work of the machine may be adjusted in a far reaching way, as will be described further below.

The front end of the rod 42 is rotarily engaged at 46 by a crescent shaped body 47 surrounding the right half of the roller 32; the plates 31 and 33 are rigidly secured by screws 47a to this crescent shaped body 47 and thus forms with them a cap covering the right or rear half of the roller 32.

As the plates 31 and 33 are rotarily arranged with their hubs on the shaft 27, and the body 47, suspended by and between them near its outer periphery, is rotarily connected to the front end of the rod 42, it is obvious that the crescent shaped body 47, owing to the rotation of the disc 40 and the eccentric connection of the rod 42 therewith, makes an upwardly and downwardly oscillating motion when the stud 41 is at the highest and lowest point, respectively, of its circular path. A shaft 75 is journaled in the U-shaped frame 28 and between the same two arms 76 and 77 are secured to said shaft 75 so as to form a pawl, which with its upper edged point enters the recesses 35.

The crescent shaped body 47 is at its inner side provided with an elevated rib 48, the face of which projects into the groove 34a and stops just slightly above the highest point of a bead arranged within said groove 34a.

At its upper front side the crescent shaped body 47 terminates into a wedge 51 which is furthermore provided with a rearwardly extending slot 52; at the lower end the crescent shaped body 47 terminates into a wedge 53. Near the outer end of the wedge 53, two pins 54 (see Fig. 2) are projecting perpendicularly from the outer face of the body 47.

The wedge 53 is faced by a solid body 55 serving as a kind of anvil on which the bending of the wires into eyes is taking place. This anvil 55 is interposed between the plates 31 and 33 and below the roller 32; it is either firmly secured to the floor 56, or, as in the present case, supported by an adjusting screw 56a and elastically arranged by coil 56b; it is provided with a central projection 57 which terminates in a ring 58 (Fig. 2) surrounding the center plate 54 (Figs. 2 and 3) by which the discs 32a and 32b are tied together. In its lower part the anvil 55 is provided with a projection 59 having a flat top surface 60, which, at its left side, with the upper projection 61 forms a slot 62. In the center of aforesaid projection 59 a recess 63 is arranged in which the lower part of the bead, to be threaded, is received during the threading operation and into the upper part of which the wedge 53 enters. On both sides of the flat top surface 60 a funnel shaped recess 64 is provided in which a rod 65 is arranged with a flat head 66 and from the upper surface of the same a handle 67 extends radially outwardly; the head 66 is furthermore provided on the side, adjoining the wedge 53, with a rim 68 which starts approximately from the middle of the handle 67 for about 90° around the head 66. The outer end of the handle 67 is connected to a rod 69 which at its one end is secured to a coil 70 and at its other end to the coil 71 slightly stronger than coil 70; both coils 70 and 71 are secured to arms 72 and 73 respectively, of which arms 72 project horizontally from the standard 29, while the arms 73 project horizontally from a standard 74 perpendicularly secured to the bottom 56.

From Figures 3 and 5 it will be noticed that on the shaft 27 a spring actuated double bent arm lever 78 is hingedly secured by having the fork shaped end 79 oscillatingly arranged around a pin 80 entered into said shaft 27. It will furthermore be noticed from an inspection of Figure 4 that the lower end of the rearwardly disposed branch of the fork 79 is provided with an arm 81 horizontally projecting towards the plate 31, which, as we see from Figure 2, is provided with a hub 82 from which a pin 83 is projecting in such manner that with the movement of the plate 31 in the direction of the arrow 84 (see Fig. 1) said pin 83 hits against that horizontal arm 81, thereby pushing the arm 81 upwardly and thereby bringing the arm 78 into the position shown in Figure 2 in fine lines. The arm 78 extends perpendicularly upwardly to slightly above the highest point of the plate 31; at its upper end the arm 85 is pivotally connected and horizontally arranged; it is pressed downwardly by the spring 86 arranged near the upper end of the arm 78. A fork shaped grip 87 depends from the free end of the arm 85. On a support 88a, arranged on the standard 25, a tube shaped spoon 88 is horizontally arranged parallel to shaft 27 and having its longitudinal axis disposed at about the height of the lower point of the recess 35. This spoon 88 has the upper part of its foremost end cut off so as to lay bare one or two beads, which pass through said spoon 88. The beads are threaded upon the wire 89 while passing through said spoon. Between the inner side of the grip 87 and the front end 88b of spoon 88, which is inclined in an angle of about 45 deg. towards the disc 32, there is just space enough for one bead only.

The operation of the machine is about as follows:

First, to start the machine, motion is imparted to the same by an electric motor or any other means (not shown) connected with the shaft arranged in the journal 38, holding the fly wheel 39 rigidly secured thereto. As soon as the motion starts, the rod 42 is moved by the disc 40 alternatively to its lowest and highest point because the stud 41, rotarily holding the rod 42, is rigidly secured close to the peripheral face of the disc 40. When stud 41 is at the lowest point of the disc 40, the rod 42 connected thereto pushes the crescent shaped body 47 with the wedge 53, provided at its lowest point, towards the anvil 55 and when the stud is at the highest point of the disc 40, the crescent shaped body 47 is lifted upwardly so that the upper plane of said body 47, formed into a wedge 51 at its front part, is disposed horizontally; alternatively this cycle of operations continues until it comes to a standstill.

Inasmuch as it was explained above that both plates 31 and 33 are fastened to the crescent shaped body 47 by means of screw threaded bolts 47a, it naturally is obvious that they follow the motion of the crescent shaped body. It was furthermore explained above that a pin 83 is fastened to and disposed on the hub 82 of the plate 31 wherefore it lifts the arm 81 upwardly at the beginning of an upward motion of the crescent shaped body 47. As soon as the pin 83 thus lifts the arm 81 upwardly, the arm 78 with its horizontal extension 85 is pushed to the left and as furthermore the spring 86 continuously presses this arm 85 with its fork shaped end 87 downwardly, it grips the wire 89 having a bead threaded thereon. As soon as the sideward swing of arm 78 takes place, the arm 85 by its grip lifts the wire 89 with one bead in an arc-shaped swing into the interstice between the discs 32a and 32b; the wire 89 falls into the recesses 35 of said discs 32a and 32b and the bead comes to rest in the groove or interstice between aforesaid discs 32a and 32b. During the upward motion, as indicated in Figures 6 and 7 by an arrow showing to the left, the plate 33 with its cutting edge 90 cuts the wire close to the orifice of the recess 35; Fig. 8 shows a bead with its proper length of wire inserted in the recesses 35 of of the discs 32a and 32b between the plates 31 and 33.

From the above explanations it is obvious that the plates 31 and 33 and the forwarding roller 32 are rotarily arranged on the shaft 27 independently of each other except for the fact that the contact between the plates 31 and 33 with the forwarding roller 32 is so close that the friction between said members is so great that the forwarding roller 32 necessarily must partake in the movement of said plates 31 and 33 except where some breaking arrangement, as provided in this case by a pawl 76 and arm 77 on opposite sides of the shaft 75 rotarily arranged in the U-shaped frame 28 (Fig. 1).

From the Figures 2 and 10 it will be apparent that during a movement of the body 47 in the direction of the hand of a clock the pawl 76 is disengaged from the opening of the recess 35 into which the weight of the arm or pawl 77 is pulling it. During the clockwise rotation of the plate 31 and the roller 32 the pawl 76 glides on the peripheral face of the disc 32b until it drops into the next following recess 35, the radial line of which with that of the next preceding one forms a certain angle alpha according to the number of recesses provided in the peripheral faces of the discs 32a and 32b (see Fig. 9). While the pawl 76 glides on the peripheral face of the disc 32b the arm 77 is out of contact with the circular path 93 of the plate 31, but it is evident that as soon as the cam 94 strikes against the lower end of the arm 77 the pawl 76 is thereby pressed into the next following recess 35 whereby the forwarding roller 32 comes to a standstill and will not move backward when the body 47, with the plates 31 and 33 connected thereto, travels in the reverse direction as illustrated by the Figure 9, the plate 31 making a way corresponding to 2 alpha during the time the pawl 77 glides from one recess 35 to and into the next following recess and is kept there by the cam 94.

Figure 18:
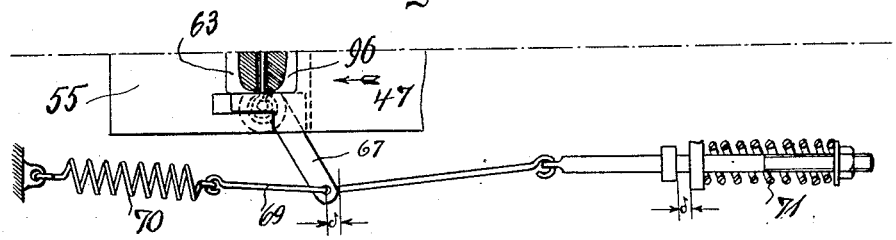
Figure 19:
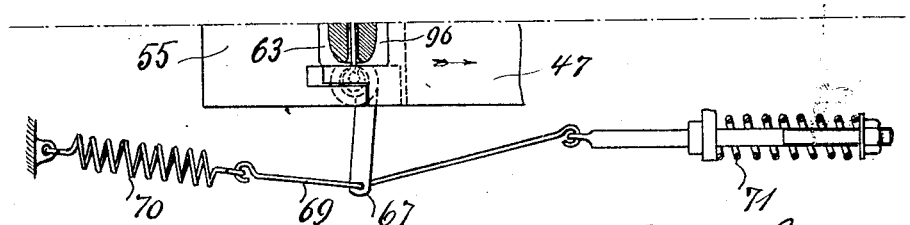

From an inspection of the Fig. 3 it is obvious that the transfer of wire with a bead thereon is impossible when the plate 31 is travelling on the downward path, that this can only take place in the beginning of its upward travel when the pin 83 strikes against the arm 81 so as to lift the arm 85 and the depending fork-shaped grip 87 takes hold of the wire 89. In this moment the recess nearest to the wedge 51 (Fig. 1) is open and the wire with the bead is deposited in the recess 35. Soon thereafter the upward travel of the body 47 has gone far enough so as to bring the cutting edge 90 of the plate 33 into action and to cut off the wire 89 close to the orifice of recess 35. The piece of wire, thus covered and carrying one bead, is now travelling continuously in a clockwise direction in the forwarding roller and between the body 47 until it arrives down near the wedge 53 at the lower end of the said body 47 and as soon as the recess 35, in which it is resting, has traveled beyond the foremost point of this wedge 53, then the wire, carrying the bead, drops on the platform 60 (Figs. 2 and 12). It will be noted from an inspection of Fig. 14 that the dropping down of a wire will be co-incident with the removal of a threaded bead from the platform 60, the body 47 being in this particular moment in its initial stage of travelling upwardly. After the wire has arrived on the platform 60 the body 47 is again on the downward path (Fig. 13, 16, 18 and 19) and the bending is effected by the pins 54, which press the wire ends against the slightly curved cheek 95, of the anvil 55, facing the recess in which the annular head 66, with the ring 68 and the handle 67, is rotarily arranged. When the body 47 presses the wire against this cheek 95 the free end of the wire is bent inwardly by hitting against the outer edge of the rim 68 and as up to now the straight end offered too much resistance to the handle 67, respectively to the spring 71 as to overcome it, this spring 71, which pulls the handle 67, is now capable of exerting its full power on the free end and causes the handle 67 to make a rotary motion and to thereby press the outer edge of the rim 68 around the pin 61 (Figs. 18 and 19).

Figure 16:
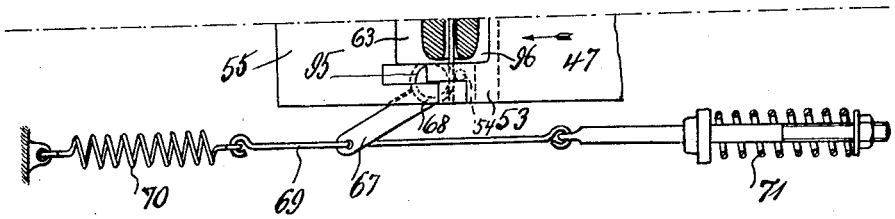
Figure 17:
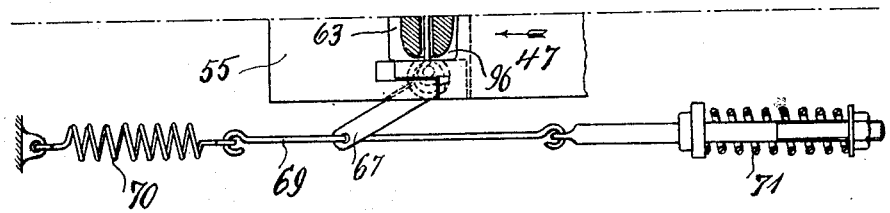

A study of the Figure 20 will disclose that on the return way of the body 47 the newly formed eye, sticking yet to the pins 54, strikes against the rim 68 on the head 66 so that the handle 67, being in addition pulled by the rod 69 and coil 70, goes back into its original position as illustrated by Figs. 16 and 17. As in the moment of the discharge of one finished bead (Figs. 13 and 14) an unfinished one is dropping out of the recesses 35 then next to the platform 60, for a new start of the cycle of operations, the slightly greater strength of the coil 71 will have no time to exert itself and to block the opening of the eye-forming means.

It is natural that with the varying size of the beads to be provided with looped wire ends by my machine, adjustments of some parts must be made in view of this variation. So for instance the recess 63, (Fig. 15) must be slightly wider than the length of the bead B, arranged in said recess during the looping action. Accordingly the wedge 53, the lower terminal of the crescent shaped body 47, must be provided with a recess 96, which with its limits surrounds the bead B in the recess 63; it is particularly necessary that the elevated rib 48 is removed by this recess 96 as otherwise the bead B is crushed during the looping action.

It is furthermore advisable to provide the horizontal arm 85, of the elastic grip, with a spring 97; the same depends towards the groove 34a and helps to press the bead B, into the recesses 35. The main adjustment, however, consists in the arm 36 in co-operation with the adjusting screws 45 below and above the arm 36. By turning the lower adjusting screw 45, it is possible to introduce the wedge 53 deeper into the recess 63; this may be necessary for various circumstances, for instance on account of the reduced size of the bead, or the smaller diameter of the wire, or for the purpose of exerting a greater pressure upon the wire. On the other side one will raise the arm 36 by means of the adjusting screws 45 if the beads are larger, or the wire is thicker and the like reasons.

What I claim is:

1. In a machine for bending the end of wires for threading beads into loops, the combination of a horizontally disposed shaft, a forwarding roller having an annular centrally disposed groove and equidistantly arranged recesses in its outer peripheral face, being rotarily arranged on said shaft, an annular plate, of slightly larger diameter than aforesaid roller, being provided with a cam and rotarily arranged on said shaft on one side of the aforesaid forwarding roller, a segmentary plate, of slightly larger diameter than aforesaid roller, having a radially disposed cutting edge, rotarily arranged on said shaft on the other side of the aforesaid roller, a crescent-shaped body, having on its inner side an elevated rib projecting into the groove of aforesaid roller, interposed between and rigidly secured to the aforesaid plates adjoining the aforesaid roller, an anvil, having a recess in its lower portion and being arranged below the forwarding roller and surrounding with its upper annular shaped terminals the middle portion of the aforesaid forwarding roller, a flat projection at the lower part of the anvil, a shorter projection arranged above and forming a rearwardly disposed slot with the aforesaid flat projection, oscillating motion imparting means operatively engaging the aforesaid crescent shaped body, a flat headed body, rotarily arranged in the anvil, on both of its sides, provided with a radially extending handle, having an elevated rim at part of the edge of the flat head, elastic means arranged on both sides of and operatively connected with aforesaid handle, a pin each arranged on each side near the edges of the wedge shaped lower terminal of aforesaid crescent shaped body.

2. In a machine as described by claim 1, the combination comprising an annular plate, provided with a cam, rotarily arranged on a shaft, a segmentary plate, having a radially disposed cutting edge, rotarily arranged on aforesaid shaft, and a grooved forwarding roller of smaller diameter than aforesaid plates rotarily arranged between the same on aforesaid shaft.

3. In a machine as described by claim 1, the combination comprising an annular plate, provided with a cam, rotarily arranged on a shaft, a segmentary plate, having a radially disposed cutting edge, rotarily arranged on aforesaid shaft, and a grooved forwarding roller of smaller diameter than aforesaid plates rotarily and frictionally arranged between the same on aforesaid shaft.

4. In a machine as described by claim 1, the combination comprising a forwarding roller consisting of two parallel plates of the same diameter, rotarily arranged on a shaft, a disc of smaller diameter disposed between and rigidly secured to aforesaid two plates, and outwardly flaring recesses radially and equidistantly arranged opposite to each other in the peripheral face of the two plates.

5. In a machine as described by claim 1, the combination comprising an annular plate, provided with a cam, rotarily arranged on a shaft, a segmentary plate, having a radially disposed cutting edge rotarily arranged on aforesaid shaft, and a grooved forwarding roller of smaller diameter than aforesaid plates rotarily disposed on the said shaft between the said plates, the forwarding roller consisting of two parallel plates of the same diameter, a disc of smaller diameter disposed between and rigidly secured to aforesaid two plates, and outwardly flaring recesses radially and equidistantly arranged opposite to each other in the peripheral face.

6. In a machine as described by claim 1, the combination comprising a crescent shaped body surrounding substantially one half of the circumference of a grooved forwarding roller, said crescent shaped body terminating into a wedge at both its upper and lower end and being provided on its inside with an elevated rib projecting into the groove of aforesaid roller, the wedge at the upper end being provided with a rearwardly extending groove and the wedge of the lower end with a recess, a pin downwardly projecting from each of the forks of the recessed wedge.

7. In a machine as described by claim 1, the combination comprising an anvil disposed below the forwarding roller and having a recess in its lower portion, said anvil having a relatively long flat projection at its lower part and a shorter projection spacedly apart above said long flat projection, both the flat and short projection forming a rearwardly disposed slot.

8. In a machine as described by claim 1, the combination comprising oscillating motion imparting means operatively engaging the crescent shape body of the machine.

9. In a machine as described by claim 1, the combination comprising a flat headed body, rotarily arranged in the anvil at both of its sides provided with a radially extending handle having an elevated rim at part of the edge along the upper peripheral line of the flat head.

10. In a machine as described by claim 1, the combination comprising elastic means arranged on both sides of the anvil and at approximately their middle operatively connected with the handle of the flat headed body rotarily arranged on both sides of the anvil.

11. In a machine as described by claim 1, the combination comprising an annular plate, provided with a cam, a grooved forwarding roller rotarily arranged on said shaft, and provided with outwardly flaring recesses radially and equidistantly arranged opposite each other in the peripheral faces of the roller frictionally engaging aforesaid plate, a pawl, adapted to engage one of the aforesaid recesses and a lever angularly disposed to said pawl, engaging the cam of aforesaid plate and pressing the pawl into said recess during the upward motion of the cresecent body.

12. In a machine for bending the ends of wires for threading beads into loops, the combination of a horizontally disposed shaft, a forwarding roller having an annular centrally disposed groove and equidistantly arranged recesses in its outer peripheral face, being rotarily arranged on said shaft, an annular plate, of slightly larger diameter than aforesaid roller, being provided with a cam and rotarily arranged on said shaft on one side of the aforesaid forwarding roller, a segmentary plate, of slightly larger diameter than aforesaid roller, having a radially disposed cutting edge, rotarily arranged on said shaft on the other side of the aforesaid roller, a crescent shaped body, having on its inner side, an elevated rib projecting into the groove of aforesaid roller, being interposed between and rigidly secured to the aforesaid plates adjoining the aforesaid roller, an anvil, having a recess in its lower portion and being arranged below the forwarding roller and surrounding with its upper annular shaped terminals the middle portion of the aforesaid forwarding roller, a flat projection at the lower part of the anvil, a shorter projection arranged above and forming a rearwardly disposed slot with the aforesaid flat projection, oscillating motion imparting means operatively engaging the aforesaid crescent shaped body, a flat headed body, rotarily arranged in the anvil on both of its sides, provided with a radially extending handle having an elevated rim at part of the edge of the flat head, elastic means arranged on both sides of and operatively connected with aforesaid handle, a pin each arranged on each side near the edges of the wedge shaped lower terminal of aforesaid crescent shaped body, a hollow spoon open at its forward end, and a reciprocating elastic grip movably arranged on a pin secured to said shaft.

13. In a machine as described by claim 12, reciprocating elastic grip perpendicularly disposed on and movably arranged on a pin secured to the shaft.

14. In a machine as described by claim 12, the combination comprising a hollow tube adopted as a passage-way for the threaded beads and open at its forward upper end, a reciprocating elastic grip prependicularly disposed on and movably arranged on a pin secured to the shaft, the longitudinal axis of both the elastic grip and the hollow tube being disposed in the same plane, the tube adjoining with its forward open end the depending forkshaped end of the grip.

In witness whereof I have hereunto set my hand.

FRANZ LORNITZO.